United States Patent [19]

Turecek

[11] 4,016,804
[45] Apr. 12, 1977

[54] THERMOSTATIC CONTROL UNIT FOR RADIATOR VALVES

[75] Inventor: Kvetoslav Turecek, Brampton, Canada

[73] Assignee: Danfoss A/S, Nordborg, Denmark

[22] Filed: Dec. 22, 1975

[21] Appl. No.: 642,790

[52] U.S. Cl. .............................. 92/34; 73/368.4; 236/42; 236/99 R; 251/61; 251/288

[51] Int. Cl.² .................................. F01B 19/00

[58] Field of Search ............. 73/368.4; 236/42, 51, 236/86, 98, 99 R; 251/61, 61.3, 284, 288; 92/13.2, 13.8, 34

[56] References Cited

UNITED STATES PATENTS

| 1,053,763 | 2/1913 | Watson | 251/288 |
| 1,920,896 | 8/1933 | Shivers | 236/42 |
| 2,045,332 | 6/1936 | Oho | 236/42 |
| 3,438,574 | 4/1969 | Killias | 236/42 |

FOREIGN PATENTS OR APPLICATIONS

| 647,816 | 9/1962 | Canada | 236/42 |
| 903,580 | 10/1945 | France | 236/51 |
| 1,404,860 | 3/1969 | Germany | 236/42 |

Primary Examiner—Martin P. Schwadron
Assistant Examiner—G. L. Walton

[57] ABSTRACT

The invention relates to a thermostatic control unit for radiator valves, this unit being of the type which has an adjustable bellows. The bellows is adjusted only during initial calibration of the thermostatic control unit or when the temperature setting of the unit is changed. The control unit includes a screw and nut arrangement in which the nut is attached to the free or moving end of the adjustment bellows. About three turns between the screw and the nut have been found suitable to provide a sufficient movement of the nut to allow an adequate adjustment of the bellows. A problem with prior units of this type is that if the screw is turned inwardly more than three turns the thread may bottom and thereby cause an excessive and damaging torque to be transmitted to the bellows. Alternately, if the screw is turned outwardly to disengage from the nut, the nut becomes cocked in the enclosed casing and it becomes impossible for the screw to re-enter the nut. The above disadvantages resulting from an excessive turning of the screw in either direction has been overcome by the present invention by providing a construction which positively limits the turning of the screw to about two revolutions.

3 Claims, 4 Drawing Figures

THERMOSTATIC CONTROL UNIT FOR RADIATOR VALVES

The invention relates to a thermostatic control unit for radiator values.

Radiator control units are known which involve a radiator valve having operating bellows and a thermostatic control unit having adjustment bellows. A liquid containing sensing bulb is connected to both the adjustment bellows and the operating bellows and the expansion and contraction of the liquid, such as toluene, due to temperature changes causes a corresponding volume change of the operating bellows which results in modulating valve movements.

The adjustment bellows is altered only during initial calibration of the control unit or when the temperature setting of the unit is changed. The control unit containing the adjustment bellows includes a screw and nut arrangement in which the nut is attached to the free or moving end of the adjustment bellows. About three turns between the screw and the nut have been found suitable to provide a sufficient movement of the nut to allow an adequate liquid displacement which permits calibrating and an adequate range of temperature settings.

A problem with the prior unit described above is that if the screw is turned inwardly more than three turns the thread may bottom and thereby cause an excessive and damaging torque to be transmitted to the bellows. Alternately, if the screw is turned outwardly to disengage from the nut, the nut becomes cocked in the enclosed casing and it becomes impossible for the screw to re-enter the nut.

The above disadvantages resulting from an excessive turning of the screw in either direction has been overcome by the invention disclosed herein by providing a construction which positively limits the turning of the screw to about two revolutions.

A main object of the invention is to provide a new and improved radiator valve thermostatic control unit of the type described above in which the turning of the calibrating and control screw is positively limited to a desired range of multiple revolutions to avoid inadvertent damaging of the unit by forcibly turning the screw through more revolutions than the angular design range.

Other objects and advantages of the invention will become apparent from the following specification, drawings and appended claims.

Figure 1:
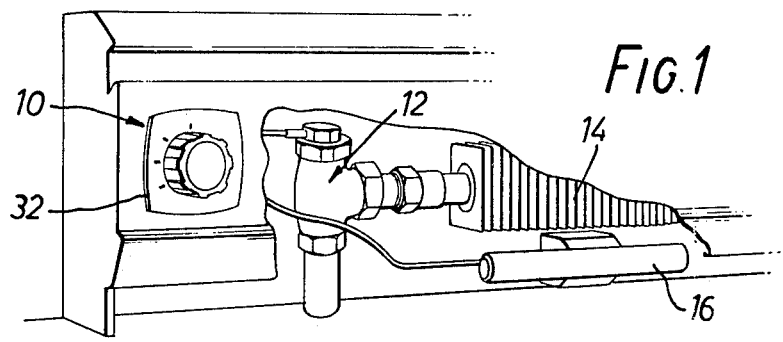
FIG. 1 is a fragmentary perspective view showing a portion of a hot water steam heating system in which a thermostatic radiator valve unit of the type to which the invention pertains is applied to a hot water radiator.

Referring to the drawing, FIG. 1 shows a portion of a hot water steam heating system in which a thermostatic radiator valve unit includes a thermostatic control unit 10 and a radiator valve 12 for controlling the flow of steam to a radiator 14. The temperature of the room is sensed by a liquid containing bulb 16 which is utilized by the control unit 10 to operate the valve 12. Valve 12 is of the modulating type for modulating the amount of steam supplied to the radiator.

Figure 2:
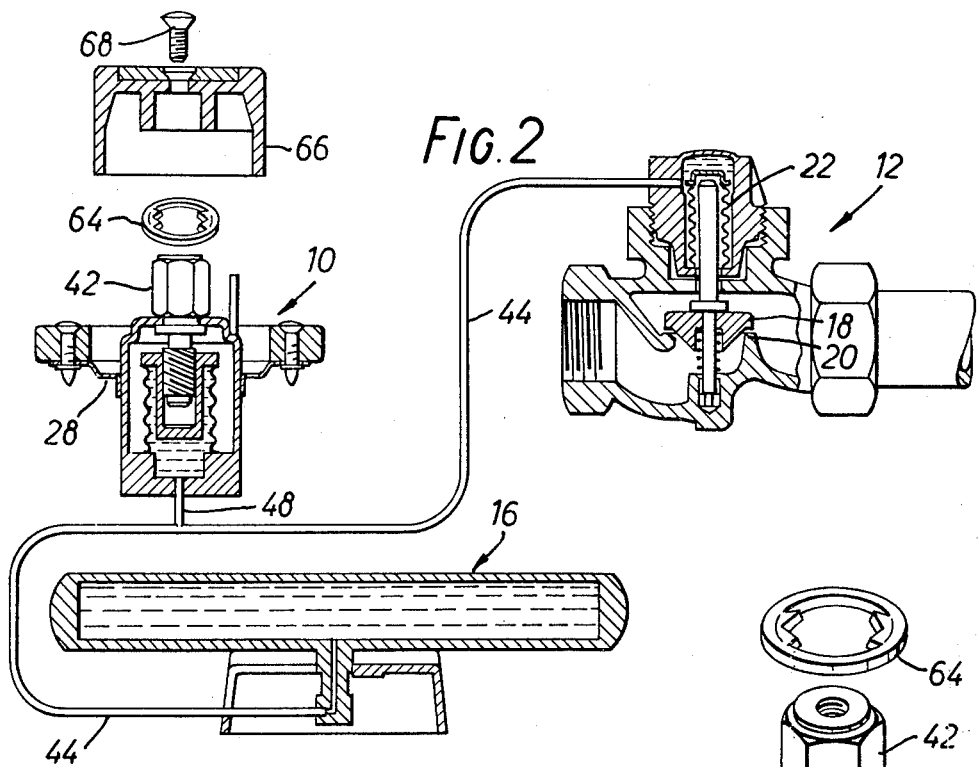
FIG. 2 is a vertical sectional and somewhat schematic view of a thermostatic radiator valve unit which includes the thermostatic control unit which embodies the invention.

Referring to FIG. 2, the valve unit 12 includes a valve body 18 which cooperates with a valve seat 20. The valve 18 is spring biased in the opening direction and pressure biased in the closing direction with a bellows unit 22.

Figure 3:
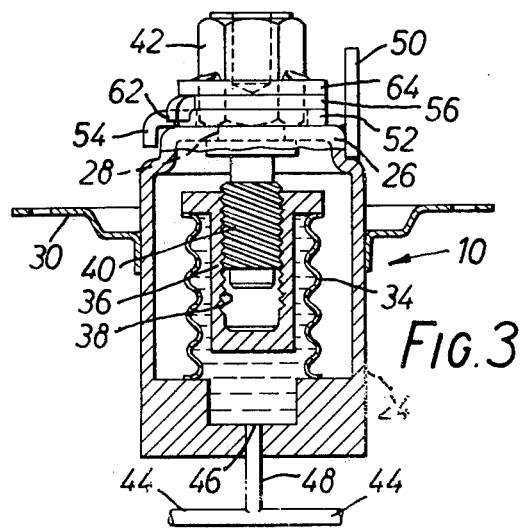
FIG. 3 is an enlarged sectional view of only the thermostatic control unit shown in FIG. 2.
Figure 4:
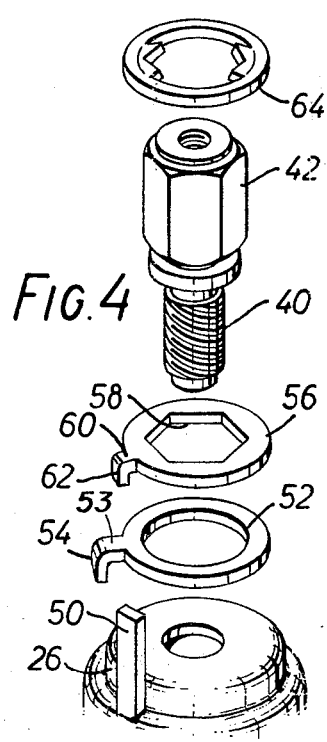
FIG. 4 is an exploded perspective view of the upper portion of the thermostatic control unit shown in FIG. 3.

Referring to FIGS. 2 and 3, the control unit 10 comprises a cylindrically shaped casing 24 having an upper collar portion 26 with a control hole 28. An annularly shaped flange member 30, soldered to the casing 10, serves as a support for a plastic decorative member 32 which also may bear numbers or words which are meaningful in the operation of the control unit.

Inside the casing 24 is a bellows 34 which is fastened to the bottom of the casing. A calibration nut 36 is attached to the upper, free end of the bellows 34 so as to be movable therewith. Calibration nut 36 has a threaded bore 38 threadedly engaged by a calibration screw 40 which has a hexagonal head 42.

A capillary tube 44 extends from the temperature sensing bulb 16 to the bellows unit 22 of the radiator valve 12. The casing 24 of the control unit 10 has a hole 46 at the bottom thereof which provides fluid communication between the interior of the bellows 34 and the exterior of the casing 24. A capillary tube spur section 48 connects the interior of the bellows 36 to the capillary tube 44.

The fluid pressure system which includes the sensor bulb 16, the bellows 34 and the bellows unit 22 is filled with a suitable liquid which may be toluene. The volume of the liquid in the system varies primarily in accordance with the varying temperature to which the sensor bulb is subjected. The position of the valve 18 relative to the valve seat 20 likewise varies, in a modulating manner, directly in accordance with the volume of the liquid in the system and indirectly in accordance with the temperature acting on the sensor bulb 16. The turning of the screw 40 varies the position of the nut 36 which, for any particular temperature to which the sensor bulb 16 is subjected, determines the volume of the bellows 22 and hence the setting of the valve 18.

By way of example, a unit may be designed so that about three turns of the screw 40 would thread it all the way into the hole 38 of the nut 36. In that case two turns of the screw would be sufficient to permit calibration and also the normal operation of the unit to control temperature by turning the screw 40 in either direction.

A problem with this type of construction is that damage could occur if the screw 40 were inadvertently turned too far in either direction. If the screw were turned to move the nut 36 too far upwardly, the thread may bottom and thereby cause an excessive and damaging torque to be transmitted to the bellows. If the turning of the screw moved the nut too far downwardly the threaded parts would disengage and, if the bellows 34 cocked to one side, re-engagement would not be possible.

The object of the invention hereof is to provide a construction which limits the screw to only two revolutions after the unit is assembled. The structure provided for accomplishing this object includes a lug 50 which extends vertically from the casing collar 26 at a radially offset distance from the axis of the casing hole 28. Assuming the screw is installed as shown in FIG. 3, a washer 52 which surrounds the shank of the screw, and is movable relative thereto, has an L-shaped lug with a radially outwardly extending lug leg 53 and a downwardly extending leg 54 which engages the fixed lug 50. With this construction the rotation of washer 52 is limited to slightly less than one turn relative to the fixed lug 52.

A washer 56 having a hexagonal shaped hole 58 nominally the same size and shape as the screw head 42 is dispoed on the screw head so as to rotate therewith when the screw is turned. Washer 56 has an L-shaped lug with a radially outwardly extending leg 60 and a downwardly extending leg 62 which can engaage washer lug portion 53 but not fixed lug 50 because leg 62 is radially inwardly of lug 50. With this construction the rotation of washer 56 (and screw 40) is limited to slightly less than one turn relative to the lug 54 of washer 52. In effect, screw 40 is thus permitted almost two turns relative to the fixed lug 50.

Although not disclosed, the addition of one or more intermediate washers having appropriate or suitable lugs between washers 56 and 52 would increase the turning range of screw 40 approximately one turn for each added washer.

The actual assembling of control unit 10 will not be described because it can be done in several ways which would be within the capabilities of skilled workers in this fields.

In the initially assembled state, screw 40 is screwed all the way into nut 36, less about 15 degrees, which results after about three turns of the screw. Washer lug 54 abuts fixed lug portion 50 and washer lug portion 62 abuts washer lug portion 53. A spring steel fastener 64 is pressed onto screw head 42 to retain washer 56 in its installed position. Spring means (not shown) are provided between nut 36 and the casing collar 26 to bias nut 36 and screw 40 in a downwardly direction.

With the lugs all in abutting relation as described, screw 40 can be turned almost two revolution in the reverse direction relative to casing 24 until lug 54 abuts the other side of lug portion 50. In a calibration procedure at the factory the screw 40 will end up approximately half way between its limiting end positions. At this time the decorative member 32 is attached and a knob 66 is attached to the screw head 44 with a screw 68.

If a central location of the screw 40 corresponds to a temperature of 70°, inward and outward movements of nut 36 caused by turning screw 40 will cause corresponding closing and opening movements of valve 18 to achieve different temperature settings. A temperature corresponding to a particular setting will be maintained in a modulating mode by the expansion and contraction of the liquid in the system due to the effects of temperature on sensor 16 which results in automatically compensating movements of the valve 18.

I claim:

1. A thermostatic control unit for radiator valves comprising, a cylindrically shaped casing having an upper collar portion defining a hole, a bellows in said casing having the lower end thereof fixedly attached to said casing, port means in said casing providing fluid communication between the interior of said bellows and the exterior of said casing, a movable nut attached to the upper end of said bellows, a calibration screw extending through said hole and threadedly engaging said nut for moving it to vary the internal volume defined by said bellows, abutment lug means extending from said collar, stop lug means carried by said screw so as to be rotatable therewith, washer means surrounding said screw having outer lug means engageable with said abutment lug means and inner lug means engageable with said stop lug means.

2. A thermostatic control unit according to claim 1 wherein said washer means comprises a single annularly shaped element whereby said calibration screw is limited to approximately two revolutions relative to said casing.

3. A thermostatic control unit according to claim 2 wherein said inner and outer lug means comprise a single element.

* * * * *